United States Patent
Levchenko (10) Patent No.: US 9,875,248 B2
(45) Date of Patent: Jan. 23, 2018

(54) SYSTEM AND METHOD FOR IDENTIFYING A FILE PATH USING TREE DATA STRUCTURE

(71) Applicant: Kaspersky Lab ZAO, Moscow (RU)

(72) Inventor: Vyacheslav I. Levchenko, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 188 days.

(21) Appl. No.: 14/744,270

(22) Filed: Jun. 19, 2015

(65) Prior Publication Data
US 2016/0292416 A1 Oct. 6, 2016

(30) Foreign Application Priority Data
Mar. 31, 2015 (RU) ................. 2015111418

(51) Int. Cl.
*G06F 17/30* (2006.01)
*G06F 21/60* (2013.01)
*G06F 21/62* (2013.01)
*G06F 21/56* (2013.01)

(52) U.S. Cl.
CPC .. *G06F 17/30091* (2013.01); *G06F 17/30961* (2013.01); *G06F 21/566* (2013.01); *G06F 21/60* (2013.01); *G06F 21/62* (2013.01)

(58) Field of Classification Search
CPC ........ G06F 21/56; G06F 21/566; G06F 21/60; G06F 21/62; G06F 17/30091; G06F 17/30961; G06F 21/30961
See application file for complete search history.

(56) References Cited

U.S. PATENT DOCUMENTS

| | | |
|---|---|---|
| 5,664,184 A | 9/1997 | Ferguson et al. |
| 7,333,988 B2 | 2/2008 | Burnett |
| 7,403,494 B2 | 7/2008 | Lee et al. |
| 7,603,346 B1 | 10/2009 | Depelteau et al. |
| 7,831,626 B1 | 11/2010 | Depelteau |
| 8,572,126 B2 | 10/2013 | Flor |
| 8,688,734 B1 * | 4/2014 | Tidd .................. G06F 17/30165 707/783 |
| 8,880,507 B2 | 11/2014 | Kotha et al. |
| 2004/0254909 A1* | 12/2004 | Testa ...................... H04L 45/00 |

* cited by examiner

*Primary Examiner* — Theodore C. Parsons
*Assistant Examiner* — Carlos M De Jesus Lassala
(74) *Attorney, Agent, or Firm* — Arent Fox LLP; Michael Fainberg (57) ABSTRACT

Disclosed is a system and method for identifying a path in a tree data structure having a plurality of levels. An example method includes receiving a request from a software application to access a resource in a computer file system using a requested path; identifying a first element in the requested path; comparing the first element with nodes in a first level of the tree data structure to identify an exact match; if the first element does not have an exact match, comparing the first element with at least one mask node in the first level of the tree data structure to identify a match by mask; and if the first element does not match one of mask nodes in the first level of the tree data structure, determining that the requested path is not in the tree data structure.

21 Claims, 4 Drawing Sheets

SYSTEM AND METHOD FOR IDENTIFYING A FILE PATH USING TREE DATA STRUCTURE

CROSS-REFERENCE TO RELATED APPLICATIONS

This application claims benefit of priority under 35 U.S.C. 119(a)-(d) to a Russian Application No. 2015111418 filed on Mar. 31, 2015, which is incorporated by reference herein.

FIELD OF TECHNOLOGY

The present disclosure relates generally to the field of computer security, and, more particularly, to systems and methods of identifying a path of a computer resource along a tree data structure.

BACKGROUND

Currently, one technique for protecting a computer from malware is to control the paths that software applications use to access computer resources. The path may be local (e.g., calls to local directories and folders), registry (e.g., calls to the registry of the operating system), network (e.g., access to other computers or resources on the Internet) and the like. Also, the syntax of the paths may vary depending on the type of operating system and the type of file system.

Antivirus applications, for example, can analyze the paths that a program uses to access computer resources, and determine the risks regarding certain actions of the program. However, the analysis is usually a time-consuming task since any analysis methods require calculations using limited hardware resources. To that end, it is possible to define a list of authorized (or unauthorized) paths, and, when a program attempts to access a particular path, the antivirus program can check these lists to determine whether program's action is allowed or prohibited.

Since the paths generally comprise strings of characters, the number of allowed paths can be quite large, and a program can access hundreds or even thousands of paths. Accordingly, the search performed by the antivirus program can be performed for a long time where CPU time spent on searching may exceed the time required to process the request of a computer resource associated with the path. To accelerate the search of a path, it may be more advantageous not to use a set of strings, but other data structures such as trees or tree data structures. However, existing systems and methods for searching paths using tree structures do not effectively solve the task of searching for different paths using a tree. Therefore, there is a need to improve the mechanism for searching paths using tree structures.

SUMMARY

Accordingly, the method and system described herein improve search performance for a tree data structure by reducing the total number of nodes of the tree in which the search is performed.

According to one aspect, a method is provided method for identifying a path in a tree data structure having a plurality of levels. In this aspect, the method includes receiving a request from a software application to access a resource in a computer file system using a requested path; identifying, by a hardware processor, a first element in the requested path; comparing, by the hardware processor, the first element with a plurality of nodes in a first level of the tree data structure to identify an exact match; if the hardware processor does not identify an exact match between the first element and one of the plurality of nodes in the first level of the tree data structure, comparing the first element with at least one mask node in the first level of the tree data structure to identify a match by mask; and if the hardware processor does not identify a match by mask between the first element and one of the at least one mask nodes in the first level of the tree data structure, determining that the requested path is not in the tree data structure.

In another aspect, the method includes if the hardware processor identifies a match between the identified first element and one of the plurality of nodes or one of the at least one mask nodes in the first level of the tree data structure, determining whether the requested path contains an additional element; and if the requested path contains an additional element, comparing, by the hardware processor, the additional element with a plurality of nodes in a second level of the tree data structure to identify an exact match for the additional element.

In another aspect, the method includes if the hardware processor does not identify an exact match between the additional element and one of the plurality of nodes in the second level of the tree data structure, comparing the additional element with at least one mask node in the second level of the tree data structure to identify a match by mask; and if the hardware processor does not identify a match by mask between the second element and one of the at least one mask nodes in the second level of the tree data structure, determining that the requested path is not in the tree data structure.

In another aspect, the method includes if the hardware processor does identifies a match by mask between the first element and one of the at least one mask nodes in the first level of the tree data structure, determining if there are child vertices; and performing a search of first element of the requested path in the tree data structure if there are child vertices and determining whether the requested path contains an additional element if there are no child vertices.

In another aspect, wherein the first element of the requested path is assigned as an initial element of the requested path and the plurality of nodes in the first level of the tree data structure are assigned as children nodes of a root node of the tree data structure, and wherein if the hardware processor identifies a match between the initial element of the requested path and one of the plurality of nodes or one of the at least one mask nodes of the children nodes of the tree data structure, assigning the matched node as a current node and comparing a subsequent node of the requested path with children nodes of the current node to determine an exact match or a match by mask.

In another aspect, the method includes if the hardware processor identifies a match between the identified first element and one of the plurality of nodes or one of the at least one mask nodes in the first level of the tree data structure, identifying each additional element in the requested path; and comparing each additional element with at least one of a exact node and a mask node in a respective additional level of the tree data structure to determine whether each additional element matches one of an exact node or a mask node.

In another aspect, the method includes granting to the software application, by the hardware processor, access to the resource in the computer file system if each additional element in the requested path matches one of an exact node or a mask node.

According to one aspect, a system is disclosed for identifying a path in a tree data structure having a plurality of levels. According to this aspect, the system includes a hardware processor configured to receive a request from a software application to access a resource in a computer file system using a requested path identify a first element in the requested path; compare the first element with a plurality of nodes in a first level of the tree data structure to identify an exact match, wherein, if the hardware processor does not identify an exact match between the first element and one of the plurality of nodes in the first level of the tree data structure, the hardware processor is further configured to compare the first element with at least one mask node in the first level of the tree data structure to identify a match by mask, and wherein, if the hardware processor does not identify a match by mask between the first element and one of the at least one mask nodes in the first level of the tree data structure, the hardware processor is further configured to determine that the requested path is not in the tree data structure.

According to one aspect, a non-transitory computer readable medium storing computer executable instructions is disclosed for identifying a path in a tree data structure having a plurality of levels. According to this aspect, non-transitory computer readable medium includes instructions for receiving a request from a software application to access a resource in a computer file system using a requested path; identifying, by a hardware processor, a first element in the requested path; comparing, by the hardware processor, the first element with a plurality of nodes in a first level of the tree data structure to identify an exact match; if the hardware processor does not identify an exact match between the first element and one of the plurality of nodes in the first level of the tree data structure, comparing the first element with at least one mask node in the first level of the tree data structure to identify a match by mask; and if the hardware processor does not identify a match by mask between the first element and one of the at least one mask nodes in the first level of the tree data structure, determining that the requested path is not in the tree data structure.

According to one aspect, the mask may be regular or recursive.

According to one aspect, a node containing a mask cannot have children.

According to one aspect, a node containing a recursive mask can have children.

According to one aspect, two masks cannot describe the same set of paths.

According to one aspect, when a new mask is added to the tree, which describes a wider set of paths than the current mask, then the current mask and all of its children are removed from the tree.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for identifying a path of a computer resource along a tree. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
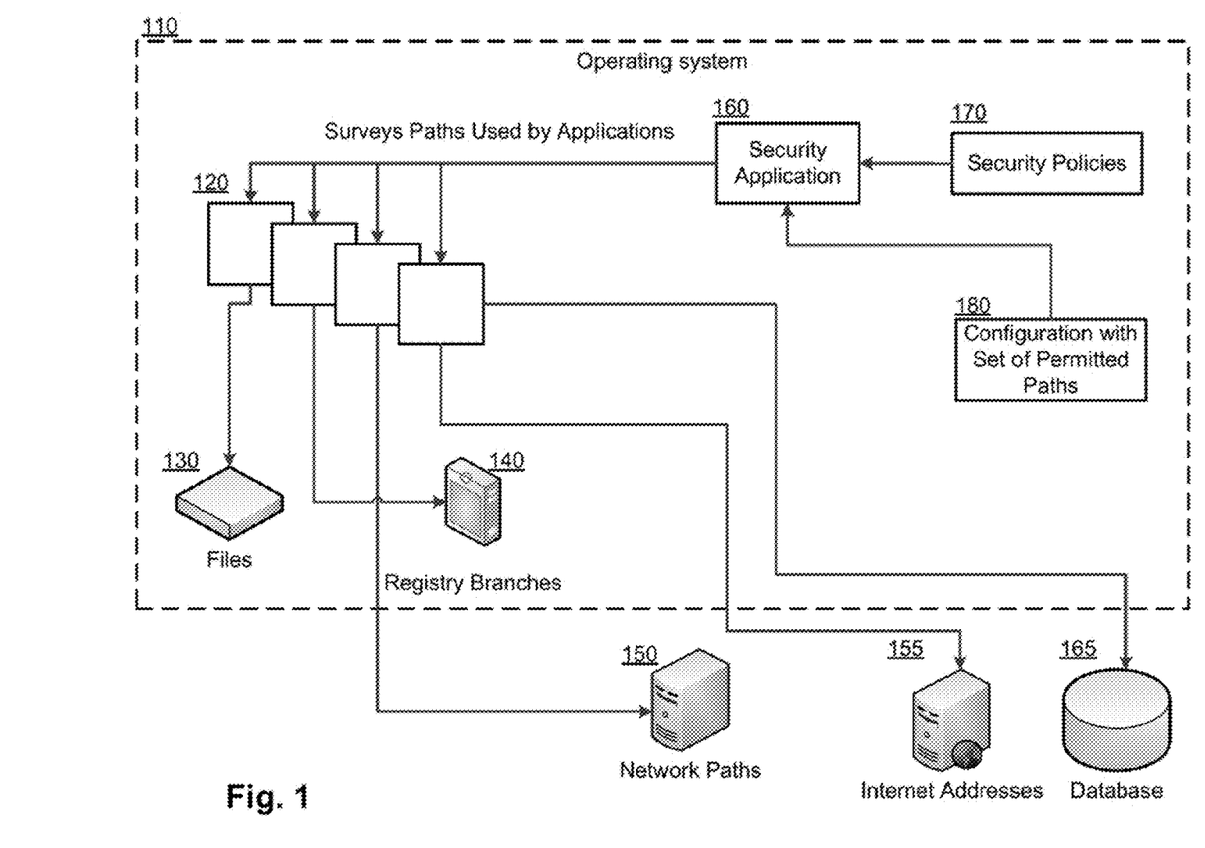
FIG. 1 illustrates an example of the operation of software on a computer.

FIG. 1 illustrates an example of the operation of software on a computer. In general, the computer operates under control of the operating system 110. Software applications 120 may call upon various resources (e.g., files, registry branches, local area network paths and the like). For computers (e.g., home computers or computers located in a corporate network), security policies and rules 170 may be determined, in which each application has its own defined set of paths of which access may be allowed. A security application (e.g., an antivirus application or the like) 160 may oversee other software applications 120 and compare the paths being used by the applications, and block the access of these applications to resources with prohibited paths in the event of violations of the security policies by such software applications.

In one aspect, the number of paths surveyed by the security application may be limited, but it can also still be rather large. Also, the security policies may contain both rules containing only permitted paths and rules containing prohibited paths. The paths can be:

local paths to files and directories 130 (i.e., the path format may differ depending on the type of device and the operating system);

paths to registry branches 140;

local area network paths 150;

addresses of Internet resources 155;

paths to certain services and servers (e.g., a line of communication with a database 165 on an SQL server);

any other paths and addresses which can be represented as a formatted string.

The paths permitted or prohibited to the software application can be described in a database or in a configured file of the security application 180. In one aspect, the group of paths will contain paths from a single directory that can be described using "masks" or regular expressions. A description using a mask reduces the total number of paths surveyed by the security application 160. More particularly, the control can be performed, for example, by intercepting application programming interface ("API") functions. However, it should be appreciated that the number of paths evaluated by the system (both permitted or prohibited) may be substantial even when masks are used. In a consecutive linear search, comparing a path that an application is using with all the possible paths may take a significant amount of time (from a processing standpoint), since it essentially amounts to a line by line comparison in succession. As a result, this type of comparison process may slow down both the execution of the individual application 120 as well as the operation of the security application 160 and/or the operating system 110 as a whole. When executing demanding tasks, such as mathematical computations or processing of database queries, a slowdown on the operating system of the computer or the server is unacceptable. Thus, a solution is needed that quickly finds paths that an application is using among the listing of permitted (or prohibited) paths.

Figure 2:
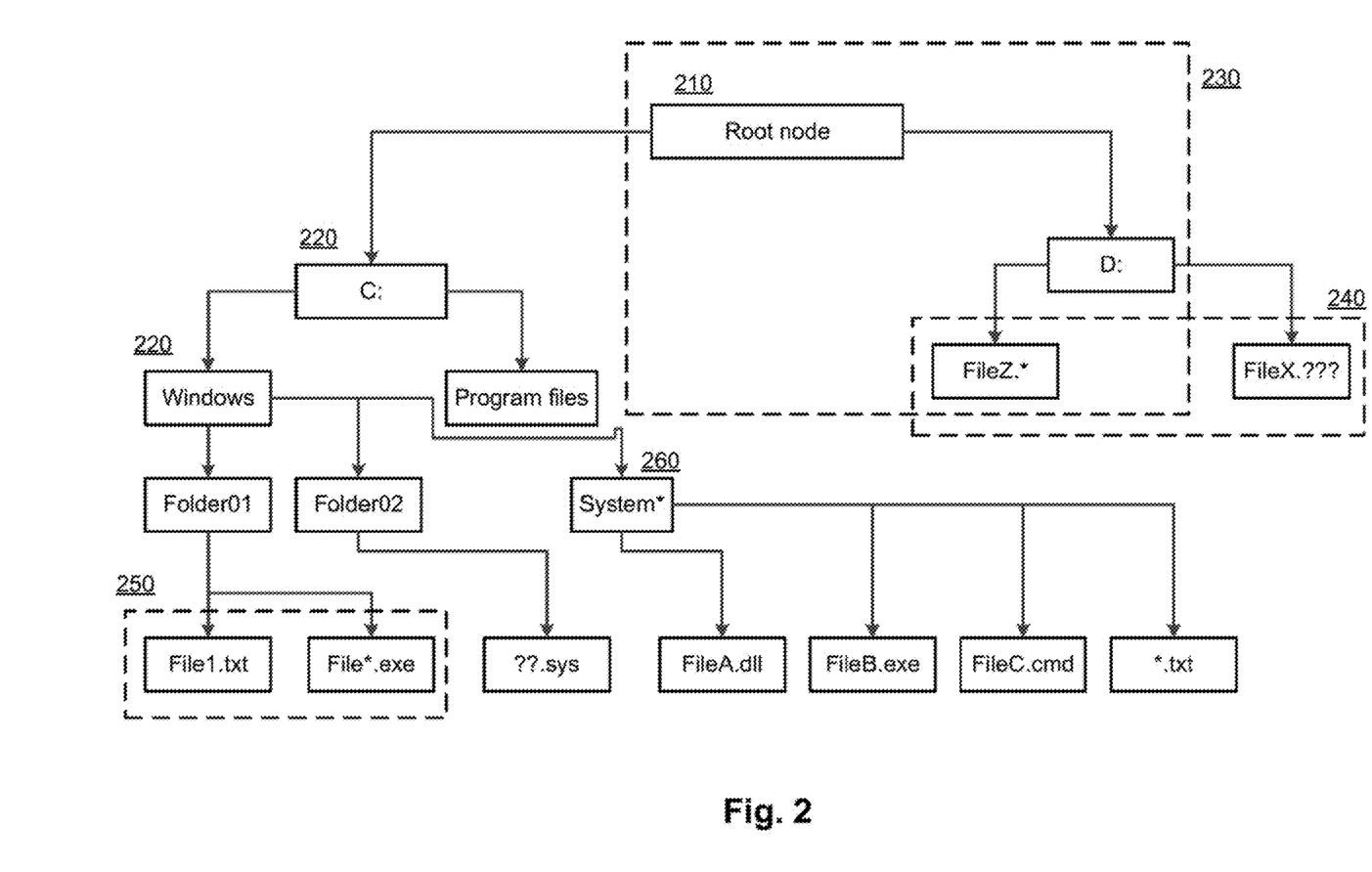
FIG. 2 illustrates an exemplary search tree data structure that contains masks of paths accordingly to an exemplary aspect.

FIG. 2 illustrates an exemplary search tree data structure that contains masks of paths accordingly to an exemplary aspect. As shown, the search tree is nonbinary, having more than two descendants. The search tree starts with a root node 210, and along its connections, the tree presents the names of files where information on the path elements is available in the nodes (vertices) 220, for example, of the tree. A path element is a line containing the name of an individual file, directory, or domain of some level. In general, a path may contain several elements connected by metacharacters or dividers. For example, the path "C:\Windows\readme.txt" contains 3 elements: "C:", "Windows", "readme.txt". The metacharacter of a divider of the path elements may be "\" or "/" and combinations of these, such as "\\".

In a particular aspect, the tree of paths is a two-dimensional data storage medium that is described by a doubly-linked list in terms of height 230 and singly-linked lists on the sublevels 240.

In the exemplary tree of FIG. 2, masks of file names can be used to designate the names of actual files (for example, those used in the operating systems DOS and Windows as arguments of the commands of command line utilities).

In general, a "mask" is a line containing metacharacters. Moreover, a metacharacter is a character that can be substituted for any predetermined number of other characters. According to an exemplary aspect, the metacharacters of the mask of a path element can be, for example, "*" and "?". In this aspect, the metacharacter "*" may designate a group of any given characters not coinciding with the input name in the search and the metacharacter "?" may designate one character not coinciding with the input name in the search.

In one example aspect, the tree can contain the following masks:
 "ordinary", nonrecursive masks, which describe the elements of the path only on a given level of the tree 250 (for example, a mask describing file names, if the vertex containing this mask does not have descendants);
 "recursive" masks, which describe the path elements on the given level and the child level of the tree 260 (for example, a mask describing the names of directories, where the vertex containing this mask can have descendants).

In another example aspect, the tree may contain an infinite number of branches describing the identical path to a file or resource. In other words, the identical path can be described by different masks. For example, the path "C:\Windows\System32\file.txt" can be described both by the mask "C:\Windows\System32\*.txt" and by the mask "C:\Windows\System*\file.*".

It should be appreciated that the indicated masks are not mutually exclusive, but rather they can contain the identical set of files. In the case where the tree has a mask that encompasses a set of files described by an additional mask, and the additional mask describes a broader set of paths, the existing mask is eliminated from the tree. For example, if the tree has described a mask "C:\Windows\System??\*.txt", and there is an added mask "C:\Windows\System*\*.*", the existing described mask may be eliminated, and the new mask can be added to the tree. That is, the existing succession of vertices and leaves corresponding to the described mask is removed from the tree, and the new succession corresponding to the new mask is added to the tree. On the other hand, if a narrower mask than the existing mask in the tree is added, the tree structure is unchanged according to an exemplary aspect.

Figure 3:
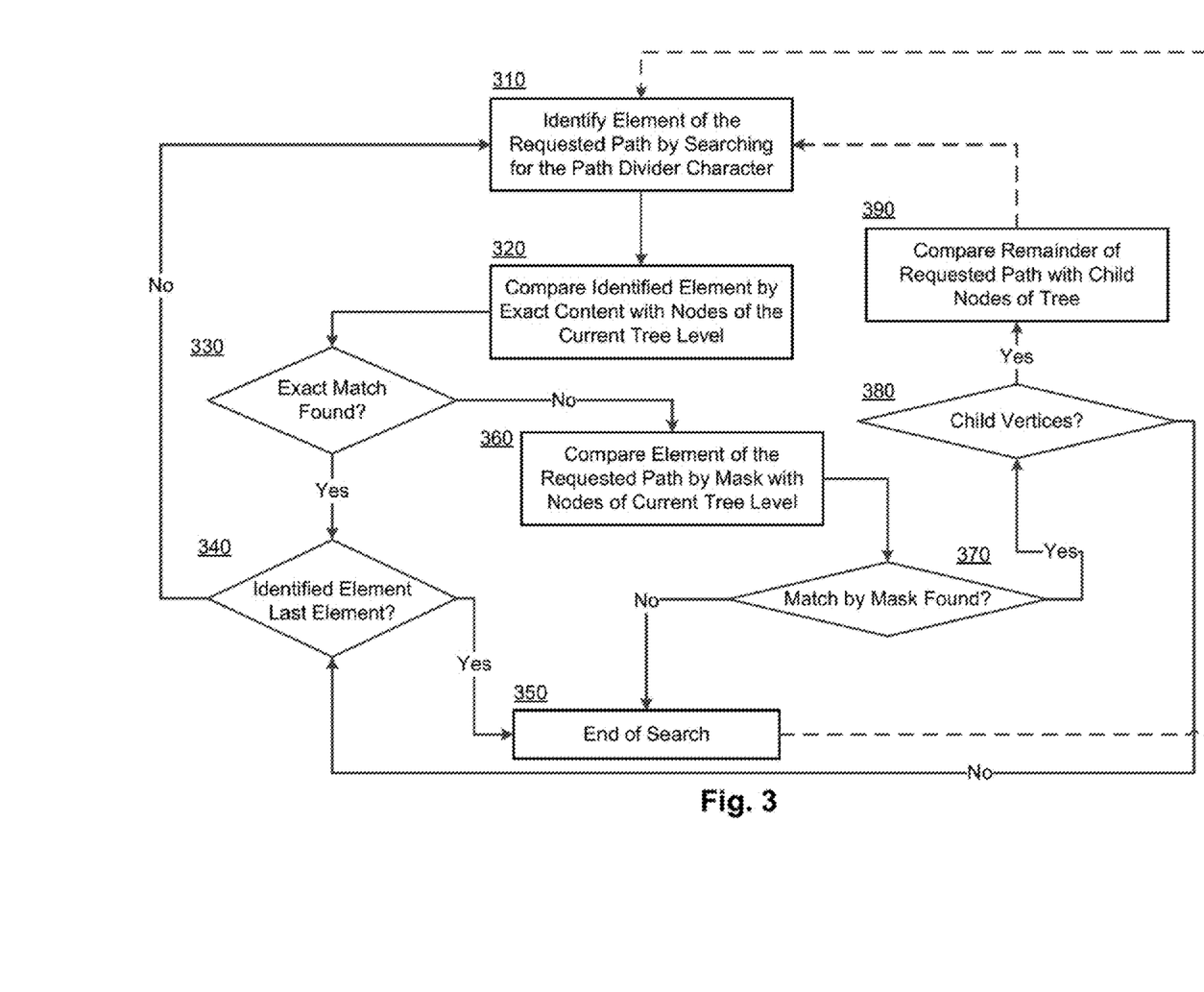
FIG. 3 illustrates an exemplary method of identifying a path to a file along the tree of path masks.

FIG. 3 illustrates an exemplary method of identifying a path to a file along the tree of path masks.

According to an exemplary aspect, the search to match a particular path (a path which is to be found in the tree) is done by an element by element comparison of the requested path from the root node of the tree. As noted above, a path element is a line containing the name of an individual file, directory, or domain of some level.

As shown in FIG. 3, in step 310, an element of the path is first identified by finding the divider character of the path (for example, the character "\" or "/"). Next, in step 320, the element identified (e.g., "C:" or "D:") is compared in terms of length and precise content against the nodes of the current tree level (all the child nodes). Then, in step 330, if a precise match is identified and the requested path contains no other components in the comparison stage 340, the match is considered to be complete, and the search is ended 350. In other words, in step 340, the exemplary method determines whether the element is the final element of the requested path and, if so, the search ends at step 350. It should be appreciated that if a match is found and the tree is for permitted paths for the software application, then the system (e.g., the antivirus program) allows the specific software application to access the requested resource (e.g., files, registry branches, local area network paths and the like) using the permitted path. Alternatively, if the tree is for prohibited paths and a match is found, then the system prohibits the software application from accessing the requested resource according using the requested path.

Referring again step 340, if the identified element from step 330 is not the final element in the path, the current child node becomes the node for the start of a search and the method continues back to step 310 for the next element in the path. Moreover, if no exact match is identified in step 330, the element in the requested path is compared with the masks in the nodes of the current tree level in step 360. If no match is found by mask in step 370, the search ends in step 350. Thus, if no match is found in step 370 and the tree is for permitted paths, then the system (e.g., the antivirus program) determines that the path is not permitted and prohibits the application from accessing the particular resource (e.g., files, registry branches, local area network paths and the like) using the requested path.

In contrast, if a match is found by mask in step 370, and child vertices 380 exist, a search is started for the remainder of the input path along the child vertices of the tree as shown in step 390. In one aspect, such a search may begin with the identification of a new element of the remainder of the requested path, starting again at step 310. Moreover, if a match is found by mask in step 370 and no additional vertices exist at step 380, the process will proceed to step 340 to determine if the identified match is the last element in the path. As described above, if the identified element is the last element in the path, the analysis ends in step 350. In this aspect, if the element of the path is the last element, and the vertex with which the last element coincided exactly or by mask does not have child vertices, it is considered that a match has been found. Alternatively, if the path element does not coincide exactly or by a mask with the vertices of the current tree, the system determines that no match was found.

An example of a search for a path "C:\Windows\readme.txt" according to the method of FIG. 3 is provided next. The algorithm first identifies elements of this path, which include: <<C:>>, <<Windows>>, <<readme.txt>>. The algorithm then search the tree for each element at a time. If an element is found in the tree, then the algorithm searches for the next element of the path on the next level of the tree. The identification of an elements may involve first exact matching of the element to those contained in a give level of the tree without using masks, and, if no exact match found, then comparison using masks may be attempted.

In one aspect, it should be appreciated that a more accurate mask holds priority in the search over a broader or recursive mask, and such a hierarchical organization of the masks allows the identification of a more accurate mask by the fastest possible path, i.e., without sorting through the usual linked lists of all mask paths and with all possible recursive masks. In one aspect, the number of searches through the entire list is equal to the number of dividers of path components.

According to another aspect, the average time for a direct search in the tree is described according to the following formula:

$$T=M*f*D/2,$$

where:

f—is the average time for comparing one component;

M—is the average number of child masks for a given tree vertex;

D—is the number of components of the input path.

It should be appreciated that the search time does not depend directly on the number of masks of the paths in the collection, but rather on the average number of child masks for the given tree vertex. The factor M increases much less than the total number of masks of exact paths added to the tree.

In one aspect, the recursive masks may be marked separately, and only this type of mask is compared in the recursive search. In another aspect, the number of significant characters of the mask is calculated in the stage of formation of the tree, that is, without metacharacters and path dividers. This number is preserved for each mask. Before comparing against an element of the input path, the number of significant characters in the string is counted (i.e., the length of string not including dividers of the path components). The number of significant characters of the mask of the current level and that of the input path is compared, if the number of these characters in the mask is greater than that in the path, the mask will never match up, and it would not be necessary in this case to compare the mask and the input path using character by character comparison.

Figure 4:
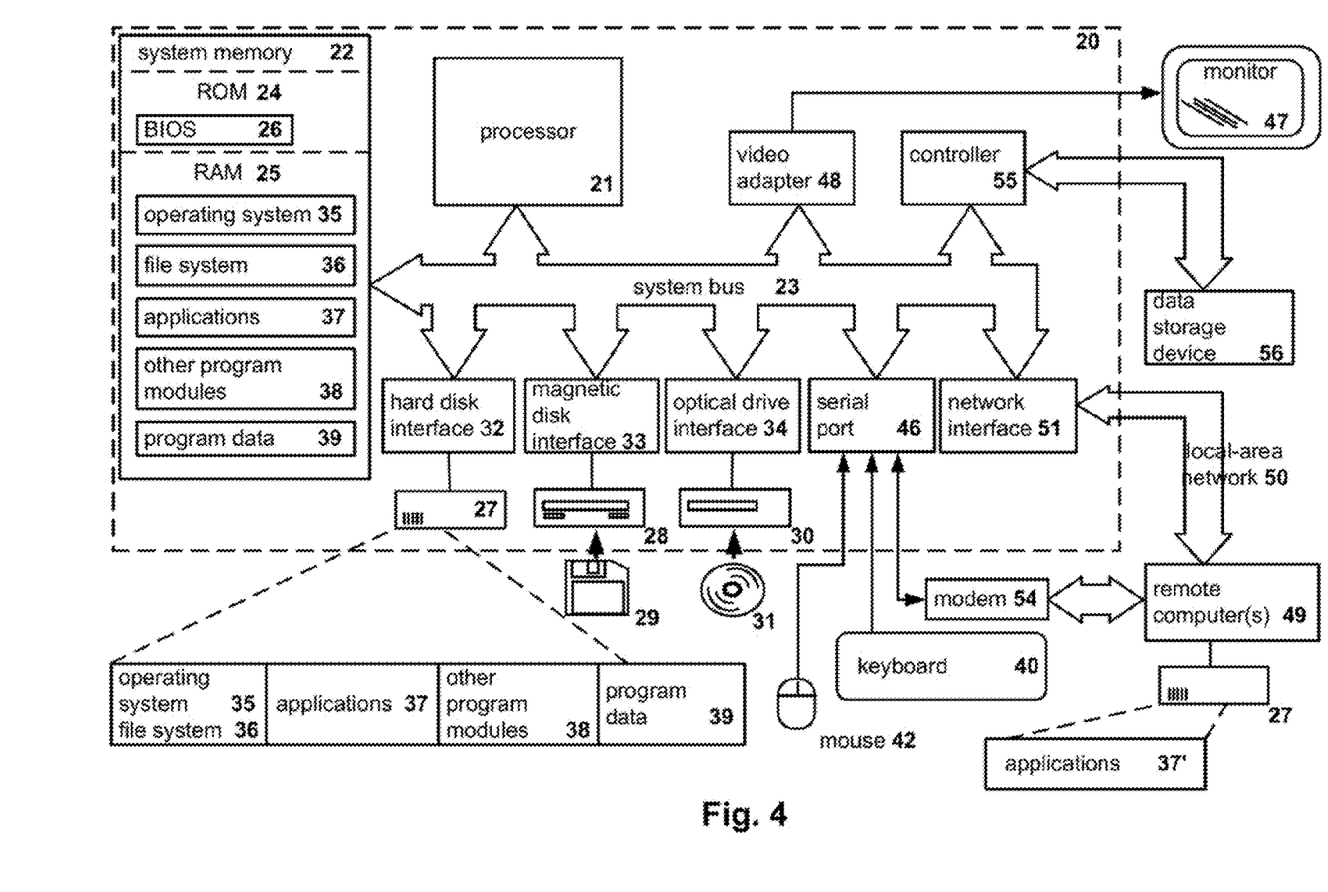
FIG. 4 shows an example of a general-purpose computer system on which the disclosed systems and method can be implemented according to an example aspect.

FIG. 4 illustrates an example of a general-purpose computer system (which may be a personal computer or a server) on which the disclosed systems and method can be implemented according to an example aspect. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for identifying a path in a tree data structure having a plurality of levels, the method comprising: receiving a request from a software application to access a resource in a computer file system using a requested path to the resource; identifying, by a hardware processor, a first element in the requested path to the resource; comparing, by the hardware processor, the first element with a plurality of nodes in a first level of the tree data structure to identify an exact match, wherein the tree data structure comprises a nested listing of paths in the computer file system, the listing corresponding to paths permissible to access by the software application; when the hardware processor does not identify an exact match between the first element and one of the plurality of nodes in the first level of the tree data structure, comparing the first element with at least one mask node in the first level of the tree data structure to identify a match by mask and wherein during comparing, narrower masks are compared with the first element before broader and recursive masks; the hardware processor does not identify a match by mask between the first element and one of the at least one mask nodes in the first level of the tree data structure, determining that the requested path is not in the tree data structure; granting the software application access to the resource in the computer file system using the requested path only when the requested path is in the tree data structure.

2. The method of claim 1, further comprising:
if the hardware processor identifies a match between the identified first element and one of the plurality of nodes or one of the at least one mask nodes in the first level of the tree data structure, determining whether the requested path contains an additional element; and
if the requested path contains an additional element, comparing, by the hardware processor, the additional element with a plurality of nodes in a second level of the tree data structure to identify an exact match for the additional element.

3. The method of claim 2, further comprising:
if the hardware processor does not identify an exact match between the additional element and one of the plurality of nodes in the second level of the tree data structure, comparing the additional element with at least one mask node in the second level of the tree data structure to identify a match by mask; and
if the hardware processor does not identify a match by mask between the second element and one of the at least one mask nodes in the second level of the tree data structure, determining that the requested path is not in the tree data structure.

4. The method of claim 1, further comprising:
if the hardware processor does identifies a match by mask between the first element and one of the at least one mask nodes in the first level of the tree data structure, determining if there are child vertices; and
performing a search of first element of the requested path in the tree data structure if there are child vertices and determining whether the requested path contains an additional element if there are no child vertices.

5. The method of claim 1,
wherein the first element of the requested path is assigned as an initial element of the requested path and the plurality of nodes in the first level of the tree data structure are assigned as children nodes of a root node of the tree data structure, and wherein if the hardware processor identifies a match between the initial element of the requested path and one of the plurality of nodes or one of the at least one mask nodes of the children nodes of the tree data structure, assigning the matched node as a current node and comparing a subsequent node of the requested path with children nodes of the current node to determine an exact match or a match by mask.

6. The method of claim 1, further comprising:

if the hardware processor identifies a match between the identified first element and one of the plurality of nodes or one of the at least one mask nodes in the first level of the tree data structure, identifying each additional element in the requested path; and comparing each additional element with at least one of an exact node and a mask node in a respective additional level of the tree data structure to determine whether each additional element matches one of an exact node or a mask node.

7. The method of claim 1, further comprising:

prior to forming the tree data structure, calculating and preserving a number of significant characters in each mask node; and prior to comparing an element path with at least one mask node, disregarding a mask node for comparison when the number of significant characters in the mask node are greater than the number of significant characters in the requested path.

8. A system for identifying a path in a tree data structure having a plurality of levels, the system comprising: a hardware processor configured to: receive a request from a software application to access a resource in a computer file system using a requested path to the resource; identify a first element in the requested path to the resource; compare the first element with a plurality of nodes in a first level of the tree data structure to identify an exact match, wherein the tree data structure comprises a nested listing of paths in the computer file system, the listing corresponding to paths permissible to access by the software application, wherein, when the hardware processor does not identify an exact match between the first element and one of the plurality of nodes in the first level of the tree data structure, the hardware processor is further configured to compare the first element with at least one mask node in the first level of the tree data structure to identify a match by mask and wherein during comparing, narrower masks are compared with the first element before broader and recursive masks, wherein, when the hardware processor does not identify a match by mask between the first element and one of the at least one mask nodes in the first level of the tree data structure, the hardware processor is further configured to determine that the requested path is not in the tree data structure; and wherein the hardware processor is further configured to grant the software application access to the resource in the computer file system using the requested path only when the requested path is in the tree data structure.

9. The system of claim 8, wherein, if the hardware processor identifies a match between the identified first element and one of the plurality of nodes or one of the at least one mask nodes in the first level of the tree data structure, the hardware processor is further configured to determine whether the requested path contains an additional element, and wherein, if the requested path contains an additional element, the hardware processor is further configured to compare the additional element with a plurality of nodes in a second level of the tree data structure to identify an exact match for the additional element.

10. The system of claim 9, wherein, if the hardware processor does not identify an exact match between the additional element and one of the plurality of nodes in the second level of the tree data structure, the hardware processor is further configured to compare the additional element with at least one mask node in the second level of the tree data structure to identify a match by mask, and wherein, if the hardware processor does not identify a match by mask between the second element and one of the at least one mask nodes in the second level of the tree data structure, the hardware processor is further configured to determine that the requested path is not in the tree data structure.

11. The system of claim 8, wherein, if the hardware processor does identify a match by mask between the first element and one of the at least one mask nodes in the first level of the tree data structure, the hardware processor is further configured to:

determine if there are child vertices, perform a search of first element of the requested path in the tree data structure if there are child vertices, and determine whether the requested path contains an additional element if there are no child vertices.

12. The system of claim 8, wherein the first element of the requested path is assigned as an initial element of the requested path and the plurality of nodes in the first level of the tree data structure are assigned as children nodes of a root node of the tree data structure, and wherein if the hardware processor identifies a match between the initial element of the requested path and one of the plurality of nodes or one of the at least one mask nodes of the children nodes of the tree data structure, the hardware processor is further configured to assign the matched node as a current node and compare a subsequent node of the requested path with children nodes of the current node to determine an exact match or a match by mask.

13. The system of claim 8, wherein, if the hardware processor identifies a match between the identified first element and one of the plurality of nodes or one of the at least one mask nodes in the first level of the tree data structure, the hardware processor is further configured to:

identify each additional element in the requested path, and compare each additional element with at least one of an exact node and a mask node in a respective additional level of the tree data structure to determine whether each additional element matches one of an exact node or a mask node.

14. The system of claim 8, wherein the hardware processor is further configured to:

prior to forming the tree data structure, calculate and preserve a number of significant characters in each mask node; and prior to comparing an element path with at least one mask node, disregard a mask node for comparison when the number of significant characters in the mask node are greater than the number of significant characters in the requested path.

15. A non-transitory computer readable medium storing computer executable instructions for identifying a path in a tree data structure having a plurality of levels, including instructions for: receiving a request from a software application to access a resource in a computer file system using a requested path to the resource; identifying, by a hardware processor, a first element in the requested path to the resource; comparing, by the hardware processor, the first element with a plurality of nodes in a first level of the tree data structure to identify an exact match, wherein the tree data structure comprises a nested listing of paths in the computer file system, the listing corresponding to paths permissible to access by the software application; when the hardware processor does not identify an exact match between the first element and one of the plurality of nodes in the first level of the tree data structure, comparing the first element with at least one mask node in the first level of the tree data structure to identify a match by mask and wherein during comparing, narrower masks are compared with the first element before broader and recursive masks; when the hardware processor does not identify a match by mask between the first element and one of the at least one mask nodes in the first level of the tree data structure, determining that the requested path is not in the tree data structure; and granting the software application access to the resource in the computer file system using the requested path only when the requested path is in the tree data structure.

16. The non-transitory computer readable medium of claim 15, further comprising:
if the hardware processor identifies a match between the identified first element and one of the plurality of nodes or one of the at least one mask nodes in the first level of the tree data structure, determining whether the requested path contains an additional element; and
if the requested path contains an additional element, comparing, by the hardware processor, the additional element with a plurality of nodes in a second level of the tree data structure to identify an exact match for the additional element.

17. The non-transitory computer readable medium of claim 16, further comprising:
if the hardware processor does not identify an exact match between the additional element and one of the plurality of nodes in the second level of the tree data structure, comparing the additional element with at least one mask node in the second level of the tree data structure to identify a match by mask; and
if the hardware processor does not identify a match by mask between the second element and one of the at least one mask nodes in the second level of the tree data structure, determining that the requested path is not in the tree data structure.

18. The non-transitory computer readable medium of claim 15, further comprising:
if the hardware processor does identifies a match by mask between the first element and one of the at least one mask nodes in the first level of the tree data structure, determining if there are child vertices; and
performing a search of first element of the requested path in the tree data structure if there are child vertices and determining whether the requested path contains an additional element if there are no child vertices.

19. The non-transitory computer readable medium of claim 15,
wherein the first element of the requested path is assigned as an initial element of the requested path and the plurality of nodes in the first level of the tree data structure are assigned as children nodes of a root node of the tree data structure, and
wherein if the hardware processor identifies a match between the initial element of the requested path and one of the plurality of nodes or one of the at least one mask nodes of the children nodes of the tree data structure, assigning the matched node as a current node and comparing a subsequent node of the requested path with children nodes of the current node to determine an exact match or a match by mask.

20. The non-transitory computer readable medium of claim 15, further comprising:
if the hardware processor identifies a match between the identified first element and one of the plurality of nodes or one of the at least one mask nodes in the first level of the tree data structure, identifying each additional element in the requested path; and
comparing each additional element with at least one of an exact node and a mask node in a respective additional level of the tree data structure to determine whether each additional element matches one of an exact node or a mask node.

21. The non-transitory computer readable medium of claim 15, wherein the instructions further comprise:
prior to forming the tree data structure, calculating and preserving a number of significant characters in each mask node; and
prior to comparing an element path with at least one mask node, disregarding a mask node for comparison when the number of significant characters in the mask node are greater than the number of significant characters in the requested path.

* * * * *